March 3, 1970

L. R. SPEREBERG 3,498,341

METHOD AND APPARATUS FOR INFLATING PNEUMATIC
TIRES WITH INERT GAS
Filed Sept. 5, 1967

*INVENTOR.*
LAWRENCE R. SPERBERG
*BY*
MARCUS L. BATES

United States Patent Office 3,498,341
Patented Mar. 3, 1970

3,498,341
METHOD AND APPARATUS FOR INFLATING PNEUMATIC TIRES WITH INERT GAS
Lawrence R. Spereberg, 6740 Fiesta Drive,
El Paso, Tex. 79912
Filed Sept. 5, 1967, Ser. No. 665,592
Int. Cl. B65b *31/04;* B60c *29/00*
U.S. Cl. 141—4                                            9 Claims

ABSTRACT OF THE DISCLOSURE

Method and apparatus for inflating the air chamber of pneumatic tires with inert gas, which includes a valve housing having multiple valve means therein, each connected to a common flow line, with a first valve means being connected to a source of inert gas, the second valve means being connected to a source of air pressure, and the third valve means being connected to a source of reduced pressure. The common outlet from the valve housing is connected to the air chamber of a pneumatic tire, and the valve means are sequentially actuated to the opened position to thereby set the beads of the tire, evacuate the air chamber of the tire, and fill the tire with an inert gas, all of which is accomplished in a rapid and orderly manner.

BACKGROUND

Ordinary air inflated tires are inferior to tires which have been inflated with an inert gas. The oxygen contained within the air chamber of a tire which has been inflated with ordinary air enters into chemical reaction with some of the compounds thereof and accordingly deteriorates the elements of the tire, thereby causing the tire to fail at an early life due to oxidative degradation. Tires which have been filled with an inert gas not only enjoy a longer life, but also are safer, especially at high speeds which generate high temperatures within the elements of the tire. Inflating tires with an inert gas has heretofore been a time consuming procedure, because the new tire must be mounted upon the wheel, the bead set in the usual manner using air pressure, followed by several inflation and deflation cycles in order to reduce the residual oxygen contained within the air chamber to an acceptable value. This procedure is wasteful of both time and nitrogen, which increases the cost of nitrogen inflation.

SUMMARY

It is therefore an object of this invention to provide a tire inflation method and flow system for inflating tires with inert gas in a manner which substantially reduces the quantity of inert gas heretofore considered necessary to obtain a predetermined minimum percentage composition of oxygen in the air chamber.

Another object of the present invention is to provide an efficient and time saving system for inflating tires with an inert gas which reduces the cost of treating the tire to a minimum.

A still further object of the present invention is the provision of a method of inflating tires with an inert gas which reduces the number of mechanical manipulations required by the person inflating the tire to a minimum.

A still further object of the present invention is the provision of a method of inflating pneumatic tires with an inert gas which conserves the quantity of inert gas required to attain a minimum residual oxygen content thereof.

A still further object of the present invention is the provision of an apparatus for inflating tires with an inert gas in an economical and efficient manner.

The above objects are attained in accordance with the present invention by the provision of a valve means connected to a source of inert gas, a pressure source, and a source of reduced pressure and wherein the valve means is adapted to be connected to the air chamber of a pneumatic tire whereupon the bead of the pneumatic tire can be set against the rim of the wheel. The tire is then evacuated, after which the tire is inflated with the inert. The valve means includes multiple inlets, each having a valve means therein and all connected to a single outlet whereupon a simple sequential manipulation of each valve means carries out the function of inerting the air chamber of the tire.

Figure 1:
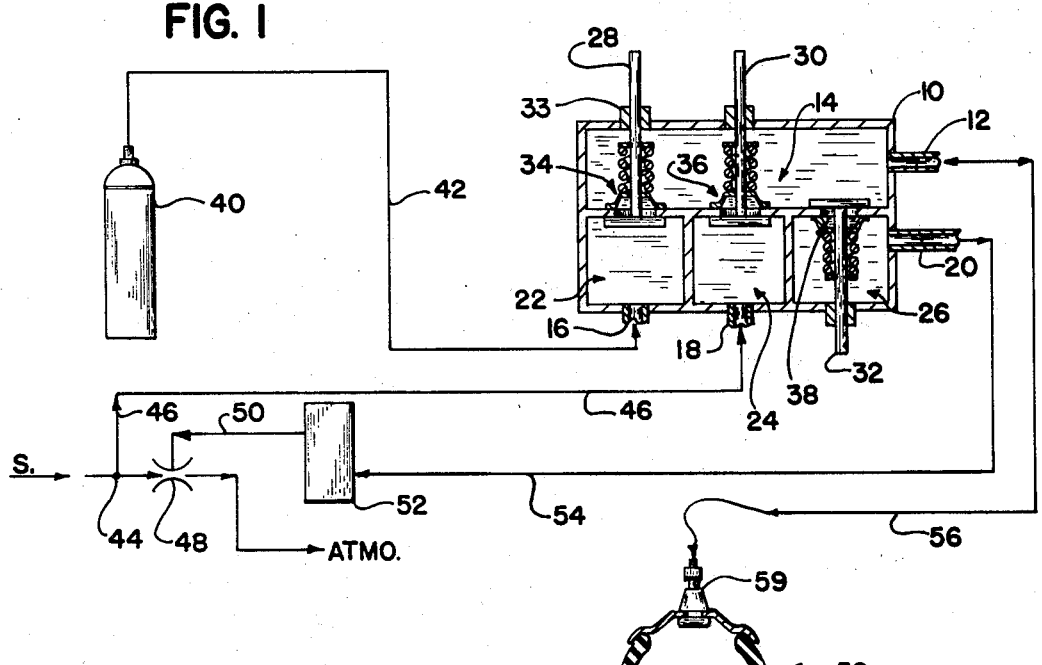
FIGURE 1 is a schematical representation or a flow diagram which illustrates a system for inflating pneumatic tires with an inert gas, and includes a cross-sectional view of a valve means associated therewith.

As seen in the flow diagram of FIGURE 1, the invention includes a valve housing 10 having an outlet 12 therein which communicates with a common chamber 14. Multiple flow conduits 16, 18, and 20 are respectively connected to a first inlet chamber 22, a second inlet chamber 24, and a third vacuum chamber 26. The last three mentioned chambers are separated from each other by the illustrated walls and from common chamber 14 by a valve means each of which includes a movable valve stem 28, 30, and 32, respectively, with each of the chambers being suitably sealed from the atmosphere by a seal means as seen at 33. Each valve is spring loaded to the closed position, as indicated at numerals 34, 36, and 38. A source of inert gas 40, which may be nitrogen, helium, carbon dioxide, or any other gas which is compatible with the air chamber of a pneumatic tire, is flow connected to a first chamber by conduit 42.

A source of air pressure S, preferably maintained above 60 p.s.i.g., flows to a T-connection 44, where it branches into two parallel circuits. The first parallel circuit is seen at 46 and communications with the second chamber 24. The second flow conduit continues through a conventional venturi 48, and flows on to the atmosphere in the indicated manner of FIGURE 1. The reduced pressure tap of the venturi is connected by means of a conduit 50 to a surge tank 52, which in turn is connected by a conduit 54 to the third vacuum chamber 26. Outlet 12 is connected to a conventional flexible tire inflating conduit or hose 56 which is adapted to inflate a pneumatic tire 58 by means of a conventional tire stem 59.

Figure 2:
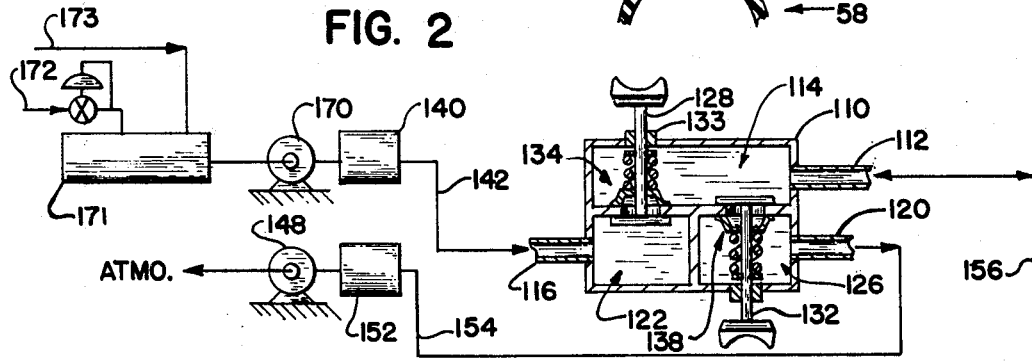
FIGURE 2 is a flow diagram of another system for inflating tires with an inert gas, with one of the valve means being shown in section.

Looking now to the details of FIGURE 2, wherein there is seen a pneumatic tire inflation system for inflating pneumatic tires with an inert gas, which includes a valve means having a housing 110 and a common outlet 112 connected to a common chamber 114. Flow conduit 116 communicates with chamber 122, and flow conduit 120 communicates with chamber 126. Valve stems 128 and 132 are slidably received by the seal means 133 which provides a seal for each valve chamber. Valve elements 134 and 138 form a portion of the wall which separates the respective valve chambers from the common chamber 114. An inert gas generator 171, having a regulated gas supply 172 and an air supply 173 provides combustion products which are transferred by pump means 170 to a surge tank 140 to thereby provide a source of inert flue gas. Conduit 142 interconnects source 140 to inlet 116.

Vacuum pump 148 exhausts the vacuum source 152 to the atmosphere, with the source being connected to conduit 120 by means of conduit 154. The common outlet 112 is connected to flexible conduit 156 which may be connected to a stem of a pneumatic tire by means of the conventional valve stem generally indicated by an arrow at 159. Additional pneumatic tires 175 through 178 may be simultaneously filled with inert gas if desired, to thereby provide all five tires of a vehicle with an inert atmosphere.

Figure 3:
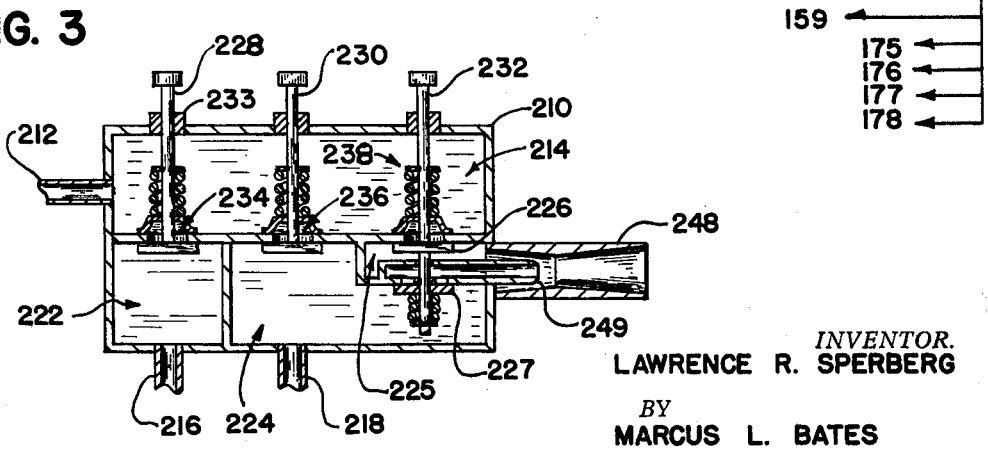
FIGURE 3 is a cross-sectional view of a modification of the valve means of FIGURES 1 and 2, with some parts not being shown in section in order to better illustrate the device.

Looking now to the details of FIGURE 3, wherein there is disclosed a valve housing 210 having a common outlet 212 connected to a common chamber 214. Flow conduits 216 and 218, respectively, are connected to chambers 222 and 224. A vacuum chamber 225 is connected to the common chamber 214 by valve elements 226 and 227, which form a portion of the illustrated chamber walls. Valve stems 228, 230, and 232, respectively, are sealed to the housing by seal means 233. The valve stems each actuate the various valves associated therewith, which includes valve means 234, 236, and 238. Each of the valve elements form a portion of the wall which separates chambers 222, 224, and 225 from the common chamber 214. A venturi 248 is opened to the atmosphere and includes nozzle 249 associated therewith for the purpose of producing a vacuum within chamber 225 when valve element 227 is in the open position. The nozzle 249 is a reduced extension of chamber 225.

OPERATION

In the operation of the first embodiment embraced by the present method, an inert gas supply 40 and a suitable air supply at 44 is operatively connected to the valve housing 10 of FIGURE 1. A source of vacuum 52 is preferably provided by means of a venturi 48 because of the convenient source of air required at 44. The tire 58 is operatively assembled upon the illustrated wheel rim, and conduit 56 is attached thereto in the usual manner. For inflation of a new tubeless tire, a compression member must be employed in order to expand the bead of the tire against the bead receiving area of the rim, in a manner known to those skilled in the art. Valve stem 30 is depressed against the illustrated spring to allow compressed air to flow through conduit 46, flow conduit 18, chamber 24, common chamber 14, outlet 12, conduit 56, and into the pneumatic tire, thus setting the bead. Valve stem 32 is next depressed allowing air to flow from the tire 58, through conduit 56, common chamber 14, through the valve element 38, chamber 26, and into the vacuum surge tank 52 along conduit 54, thus evacuating the tire to about one third of an atmosphere. This is the minimum practical value to which a tubeless tire can usually be evacuated without unseating the beads from the rim. Valve stem 32 is released and valve stem 28 depressed thereby allowing inert gas to flow along conduit 42, passageway 16, chamber 22, through the valve 34, into the chamber 14, where the inert gas then flows along to the pneumatic tire by means of conduit 56. The pneumatic tire 58 now contains slightly more than 2% oxygen therein, which may be considered a satisfactory reduction in the oxygen content for ordinary driving. For high speed driving it is best to again evacuate the tire in the before described manner and again inflate the tire to 28 p.s.i.g. with nitrogen, thereby reducing the residual oxygen content to far less than 1%.

It is pointed out that the source of inert gas 40 may be either liquid or compressed nitrogen, or any other inert gas which is compatible with the material forming the air chamber of the elastomeric product.

Looking now to the details of FIGURE 2, wherein an inert gas generator 171 is seen which provides combustible products to a conventional compressor 170, which compresses the inert gas to provide a readily available source at 140. The air/fuel ratio is adjusted to maintain a minimum oxygen content at 140. The surge tank 140, containing the source of inert gas, may also contain an oxygen scavenger in order to remove the last traves of oxygen from the flue gases. Furthermore, surge tank 140 provides a convenient water knock-out drum to remove the accumulated moisture which results from the products of combustion which form the flue gases. Vacuum surge tank 152 may be connected to any suitable vacuum producing means 148 which includes inspirators, vacuum pumps, and the like. The pneumatic tire is attached to conduit 156 by means of the tire valve stem in the conventional manner.

Assuming the bead of the tire has already been set to the wheel, valve stem 128 is depressed thereby opening valve element 134 to permit inert gases to flow through passageway 116 into chamber 122, through valve means 134, into the common chamber 114, whereupon the flue gases then flow through passageway 112 through conduit 156, to where the tire 158 is inflated with dry oxygen-free flue gases.

The valve stem 132 is then depressed, upsetting valve element 138, to thereby permit the inflated pneumatic tire 158 to be evacuated along the flow path formed by conduit 156, passageway 112, common chamber 114, chamber 126, passageway 120, and on to the source of vacuum 152 by means of conduit 154, to thereby reduce the pressure within the tire to about one third atmosphere absolute. The tire is next again inflated with flue gases in the above described manner, and the operation of purging is continued until the desired percentage composition of residual oxygen is attained.

As previously explained in conjunction with FIGURE 1, the tire will contain slightly more than 2% oxygen when it is evacuated and filled with inert gas, which is a great improvement over an ordinary air inflated tire containing 21% oxygen. However, since the flue gases at 140 are nominal in cost, it is advisable to evacuate and to pressure the tire a second time to thereby reduce the residual oxygen contained therein to less than 1%, assuming that the flue gas generator 171 is providing a source of inert at 140 which is substantially oxygen free. In this respect, it is advantageous to incorporate an indicator between generator 171 and inlet 116 to enable rapid determination of the oxygen content flowing through conduit 142. Any known and convenient indicator is suitable for this purpose.

Where all five tires of a vehicle (counting the spare) are to be inflated with the insert gas, it is advantageous to attach the tire filling conduit to five parallel flow connected flexible hoses, each having a tire chuck thereon so as to enable all five tires to be treated simultaneously. This is generally illustrated by the arrows seen at numerals 175 through 178.

FIGURE 3 is a modification of the device seen in FIGURE 1, and may advantageously be utilized by connecting the common passageway 212 in the manner seen at 56 through 59 of FIGURE 1, or 156 through 159 and 175 through 178 of FIGURE 2. Inert inlet 216 is connected to any suitable supply of inert gas. Tire pressure inlet 218 is connected to a source of compressed air, When it is desired to inflate the air chamber of a tire with an inert gas, valve stem 230 is depressed, thereby providing a source of air flow through passageway 218, chamber 224, valve assembly 236, and through passageway 212 to thereby inflate the tire with air and thus set the bead, assuming a new tubeless tire. The tire is then evacuated by depressing valve stem 232 which permits a flow of compressed air through passageway 218, valve assembly 227, nozzle 249, venturi 248, whereupon a vacuum is produced about the outer peripheral portion of 249, thus evacuating chamber 214 and causing air to flow from the pneumatic tire, through passageway 212, chamber 214, valve assembly 226, to where the air is moved along by the mass-flow provided by the nozzle 249. The valve 232 is released, thus sealing off the wall which separates chambers 225 and chamber 214, as well as stopping the flow of air from chamber 224 through the nozzle 249. Valve stem 228 is then depressed to provide a flow path along passageway 216, 222, valve assembly 234, common chamber 214, passageway 212, and to a tire, whereupon the tire is suitably inflated with inert gas. Where it is deemed desirable, the tire may be evacuated and again inflated with inert for a multiplicity of times in order to reduce the residual oxygen content thereof to any desired percentage composition.

Thus the various steps recited in conjunction with the above description comprises a new method of evacuating and filling tires with an inert gas. This method provides a rapid inert inflation procedure while conserving the total quantity of inert gas required. The method includes the use of an improved flow system as set forth in detail above, as well as the use of an improved valve means therefor. Accordingly, in carrying out the above method, a new apparatus for use in inerting pneumatic tires has necessarily been brought forth.

I claim:
1. A flow system for providing the air chamber of a pneumatic tire with an inert gas, including a source of inert gas, a source of reduced pressure, and valve means adapted to be connected between the air chamber of the pneumatic tire, the source of reduced pressure, and the source of inert gas;
   first means associated with said valve means for controlling flow from the air chamber of the tire to said source of reduced pressure;
   second means associated with said valve means for controlling the flow of inert gas from said inert gas source to the air chamber of the tire;
   and third means associated with said valve means for providing a flow of gaseous pressure into the air chamber of the tire to thereby enable the beads of the tire to be set prior to a first evacuation; whereby:
   said valve means selectively permits flow from said pneumatic tire to thereby evacuate the air chamber of said tire, and permits flow from said inert gas source into said pneumatic tire a sufficient number of times to thereby purge free oxygen from the air chamber.

2. The flow system of claim 1, wherein the source of inert gas includes an inert gas generator having a source of fuel, a source of air, and a compressor to thereby provide a pressurized source of inert gas.

3. In a flow system for providing the air chamber of a pneumatic tire with inert gas, wherein said flow system includes a source of inert gas, a source of reduced pressure, a source of air pressure, and valve means adapted to be flow connected between the gas chamber of the pneumatic tire, the source of reduced pressure, the source of air pressure, and the source of inert gas;
   said valve means includes a valve housing having means forming a common chamber and a first, second, and third chamber with said common chamber being separated from the remaining chambers by a wall, said wall having a valve element therein to thereby provide a first, second, and third valve, connected to said first, second, and third chambers, respectively;
   said common chamber having an outlet to the air chamber of the tire;
   said first chamber including means for being flow connected to the inert gas source;
   said second chamber including means for being flow connected to the source of air pressure;
   said third chamber including means for being flow connected to the source of reduced pressure; whereby.
   opening said first valve flow connects said inert gas source to the air chamber of the tire, opening said second valve flow connects the source of air pressure to the air chamber of the tire, and opening said third valve flow connects the source of reduced pressure to the air chamber of the tire, to thereby enable the air chamber of the tire to be pressurized with air, and then evacuated and filled with inert gas a sufficient number of times to purge most of the free oxygen from the air chamber, whereupon the tire can then be finally inflated with the inert gas.

4. The flow system of claim 3, wherein a venturi provides said vacuum source, with said air pressure source providing the mass-flow of fluid through said venturi.

5. In a valve means for filling the air chamber of a pneumatic tire said valve means communicating with a source of inert gas, a source of inert gas, a source of air pressure, the improvement comprising:
   said valve means includes a housing, wall means having apertures therein dividing said housing into a common chamber and a first, second, and third chambers;
   said apertured wall means communicating each of said first, second and third chambers with said common chamber by a first, second, and third valve means;
   a venturi, means flow connecting said venturi with said second chamber and including another valve means for controlling the flow therethrough; means communicating said third chamber with the low pressure area of said venturi;
   said common chamber being adapted to be connected to the air chamber of a pneumatic tire, said first chamber includes means by which it is adapted to be connected to the inert gas source, said second chamber includes means by which it is adapted to be connected to the source of air pressure, whereby: opening said first valve means provides a flow of inert gas to the air chamber of the tire, opening said second valve provides a source of high pressure air to the air chamber of the tire, and opening said third valve together with said another valve means provides a source of air flow through said venturi to thereby evacuate said third chamber which in turn is adapted to evacuate the air chamber of the pneumatic tire.

6. The device of claim 5 wherein said common chamber is flow connected to multiple conduits each adapted to be connected to the air chamber of a pneumatic tire, to thereby simultaneously inflate a multiplicity of tires with an inert gas.

7. A method of providing an inert atmosphere within an elastomeric chamber comprising the steps of:
   (1) providing a source of inert gas for the chamber;
   (2) providing a source of vacuum for the chamber;
   (3) evacuating the chamber by flow connecting the chamber to said source of vacuum;
   (4) connecting said source of inert gas to the chamber to thereby inflate the elastomeric chamber with the inert gas;
   (5) repeating steps (3) and (4) until the elastomeric chamber is substantially free of oxygen.

8. The method of claim 7 wherein the inert gas is nitrogen, and further including the step of:
   (6) providing a unitized valve means for controlling the flow of gas in steps (3), (4), and (5), to allow steps (3) and (4) to be carried out by sequentially operating the valve means.

9. The method of claim 8 wherein the elastomeric chamber is a multiplicity of tires, all of which are simultaneously provided with an inert atmosphere by carrying out steps (3), (4), and (5).

References Cited

UNITED STATES PATENTS 2,235,510  3/1941  Watrous _____ 141—66
3,215,503  11/1965  Nessler _____ 23—281

FOREIGN PATENTS 78,555  7/1955  Netherlands.

LAVERNE D. GEIGER, Primary Examiner

EDWARD J. EARLS, Assistant Examiner

U.S. Cl. X.R.

141—38, 49; 152—415